(No Model.)

C. G. SMALL.
DRILL CHUCK.

No. 516,775. Patented Mar. 20, 1894.

WITNESSES.

INVENTOR.

UNITED STATES PATENT OFFICE.

CHARLES G. SMALL, OF EASTHAMPTON, MASSACHUSETTS.

DRILL-CHUCK.

SPECIFICATION forming part of Letters Patent No. 516,775, dated March 20, 1894.

Application filed April 19, 1893. Serial No. 471,052. (No model.)

*To all whom it may concern:*

Be it known that I, CHARLES G. SMALL, a citizen of the United States, residing at Easthampton, in the county of Hampshire and State of Massachusetts, have invented a new and useful Drill-Chuck for Use on a Lathe or any Desired Machine for Holding Drills and Small Pieces for Turning, of which the following is a specification.

This invention relates to improvements in drill chucks, the object of the invention being to provide means for allowing the drill to be accurately adjusted before it is firmly fastened in the chuck for operation, at the same time adapting itself for the reception of drills of the various sizes and tapers; a further object being to provide novel means whereby a crooked drill may be centered, thus overcoming the wabbling or irregular motion incident to the use of a drill defective in this particular. It will also be seen that when a spindle has been sprung in the drill press, this chuck will adjust itself so as to take up the irregular motion which it would otherwise impart.

A still further object of the invention is to provide a device which shall be simple of construction, strong, efficient, satisfactory and inexpensive of manufacture.

Finally the invention consists in various novel details of construction, arrangement and combinations of parts, to be hereinafter more particularly described and specifically pointed out in the claims.

In describing the invention in detail, reference is had to the accompanying drawings forming part of this specification, wherein like letters of reference indicate similar parts throughout the several views, in which—

Figure 2:
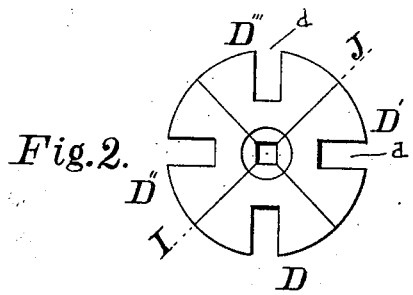
Figure 3:
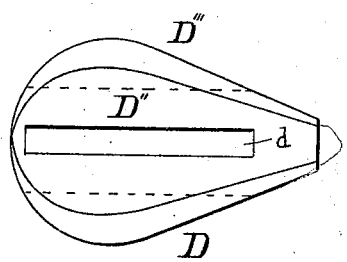
Figure 1:
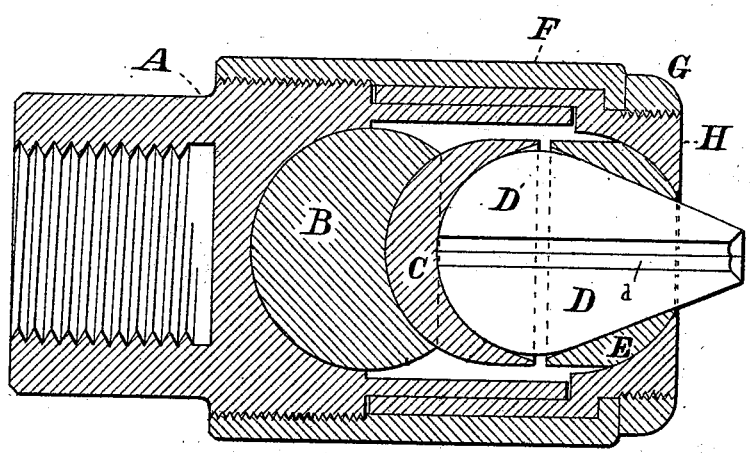
Figure 4:
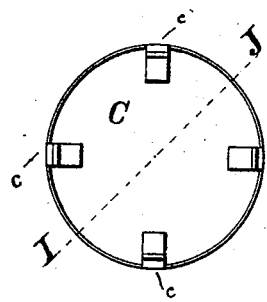
Figure 5:
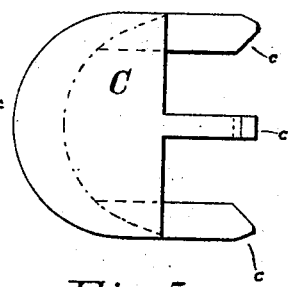
Figure 6:
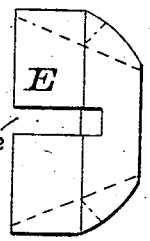
Figure 7:
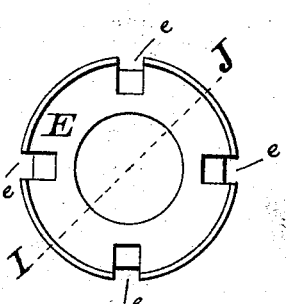

Figure 1. is a longitudinal sectional view of the improved chuck showing the relative position of the different parts. Fig. 2. is an end view of the four jaws collectively. Fig. 3. is a top view of the same. Fig. 4. is a detail view of the cup in which the jaws are collected. Fig. 5, is a side view of the same. Fig. 6, is a side view of the cap, and Fig. 7, is a view of the cap looking from the underneath side.

In the drawings A, indicates the body portion of the chuck which is attached to the drill or lathe by means of screw-threads or a tapering shank in the well known manner. This body portion being so formed as to provide a seat for the reception of the ball bearing B, having its surface hollowed out which in turn forms a bearing for the cup C, containing the jaws D, D', D'', D'''. This cup is provided with extension ribs c, c, c, which extend slightly beyond the face of the cup proper. The ribs c, c, c, are grooved in the wall of the cup and are formed with straight sides and faces which engage the slots d, d, of the jaws D, D', D'', D''', which have a rounded or conical base movably arranged in the bearing C. The opposite end of the jaws have a tapering outer surface and a straight inner surface thus forming a cone-shaped clamp which extends partly through the interior cap E, said cap having slots e, e, e, e, which are engaged by the ribs c, c, c, c, of the cup. The parts C and E, when connected, form an elongated casing for the jaws, said casing being further inclosed by a collar or sleeve H, having a flange h, to engage a longitudinal groove formed in the extension a, of the body portion A, thus insuring against rotary motion. The sleeve H, is further provided with a screw thread g, for the securement of the outer or retaining cap G. The sleeve H, and outer casing F, may be made integral, thus simplifying the parts; furthermore, the bearing B, may be dispensed with and by allowing C, to rest in the seat formed in A, thus making a simpler construction, but reducing its capacity for adjustment.

It will be particularly noted that various changes may be made in the detail construction of the device without materially departing from the general idea involved.

Operation:—When it is desired to secure a drill for use, it is inserted in the jaws of the chuck which by reason of their rounded base working in the cup are enabled to adjust themselves to drills of various sizes and also the jaws by reason of the peculiar bearing will incline to allow for the proper adjustment of the drill which otherwise might not run true, by reason of a spring shaft or bent drill. The cup D, resting in the hollowed-out portion of the ball bearing B, changes its position and adapts itself so as to allow the point of the drill to center and run true in accordance with the fixed center. After the drill has been properly adjusted, the collar or sleeve H, is tightened and by reason of its flanged top carries with it the cap E, which in turn engages the tapering surface of the jaws, forcing their inner faces against the drill, thus securely holding it in position.

Having fully described my invention, what I claim as new, and desire to secure by Letters Patent, is—

1. A drill chuck consisting of jaws, the cup C, and the cap E, surrounded by suitable casing, the parts being combined substantially as described.

2. In a drill chuck, the combination of the body portion A, the ball bearing B, the flanged collar H, the cup C, the cap E, and the jaws D, D', D'', D''', substantially as described.

3. In a drill chuck, the combination of the screw threaded body portion A, the cup C having extension ribs c, c, c, c, the cap E, having the slots e, e, e, e, and the jaws arranged and operating substantially as described.

4. In a drill chuck the combination of the body portion A, the ball bearing B, the cup C, seated in the hollowed out ball bearing, and having extension ribs c, c, c, c, the cap E, the flanged collar H, and the jaws substantially as described.

CHARLES G. SMALL.

Witnesses:
GEORGE S. BUCKNER,
JOHN M. PRENTISS.